US012456411B2

(12) United States Patent
Huang et al.

(10) Patent No.: US 12,456,411 B2
(45) Date of Patent: Oct. 28, 2025

(54) DISPLAY PANEL AND IMAGE DISPLAY METHOD

(71) Applicant: AUO Corporation, Hsin-Chu (TW)

(72) Inventors: Yu-Jung Huang, Hsin-Chu (TW); Zuei-Tien Chao, Hsin-Chu (TW); Chih-Ming Chen, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 124 days.

(21) Appl. No.: 18/398,226

(22) Filed: Dec. 28, 2023

(65) Prior Publication Data

US 2024/0428719 A1 Dec. 26, 2024

(30) Foreign Application Priority Data

Jun. 21, 2023 (TW) ................................ 112123503

(51) Int. Cl.
*G09G 3/20* (2006.01)
*G09G 3/36* (2006.01)

(52) U.S. Cl.
CPC ............. *G09G 3/2092* (2013.01); *G09G 3/20* (2013.01); *G09G 3/36* (2013.01); *G09G 2300/0814* (2013.01); *G09G 2310/0267* (2013.01); *G09G 2310/0286* (2013.01)

(58) Field of Classification Search
CPC .......... G09G 3/20; G09G 3/2096; G09G 3/36; G09G 2300/0814; G09G 2310/0267; G09G 2310/0286
See application file for complete search history.

(56) References Cited

U.S. PATENT DOCUMENTS

| | | | | |
|---|---|---|---|---|
| 7,123,247 | B2 | 10/2006 | Morita | |
| 2001/0007453 | A1 | 7/2001 | Yamamoto et al. | |
| 2002/0075287 | A1* | 6/2002 | Naka | G09G 3/2092 345/690 |
| 2005/0168416 | A1* | 8/2005 | Hashimoto | G09G 3/3291 345/76 |
| 2005/0276369 | A1* | 12/2005 | Mutaguchi | G09G 3/3648 377/64 |
| 2007/0291021 | A1 | 12/2007 | Awakura et al. | |
| 2012/0019508 | A1 | 1/2012 | Wei et al. | |
| 2014/0078161 | A1 | 3/2014 | Suzuki | |
| 2017/0061869 | A1* | 3/2017 | Bae | G09G 3/3275 |

FOREIGN PATENT DOCUMENTS

| | | |
|---|---|---|
| TW | 202221691 A | 6/2022 |

* cited by examiner

*Primary Examiner* — Cory A Almeida
(74) *Attorney, Agent, or Firm* — WPAT, PC

(57) ABSTRACT

An image display method, comprising: setting multiple first driving voltages on a first row of multiple pixel units according to a first driving signal by a driving circuit and multiple data registers; and setting multiple second driving voltages on a second row of the pixel units according to a second driving signal by the driving circuit and the data registers. Wherein setting the second driving voltages of the second row of the pixel units comprises: when one of the second driving voltages is equal to one of the first driving voltages, and both correspond to the same one of the data registers, disabling an input terminal of the same one of the data registers, so that the same one of the data registers maintains one of the first driving voltages as one of the second driving voltages.

20 Claims, 7 Drawing Sheets

100

DISPLAY PANEL AND IMAGE DISPLAY METHOD

CROSS-REFERENCE TO RELATED APPLICATION

This application claims priority to Taiwan Application Serial Number 112123503, filed Jun. 21, 2023, which is herein incorporated by reference in its entirety.

BACKGROUND

Technical Field

The present disclosure relates to image display technology, more particularly a display panel and an image display method.

Description of Related Art

With the rapid development of electronic technology, display devices are widely used in daily life, such as smart phones or computers. Display device will separately control the brightness of each pixel of the display panel to present the corresponding image, and the method the display device updates the image will affect its display quality.

SUMMARY

One aspect of the present disclosure is an image display method, comprising: setting, by a driving circuit and a plurality of data registers, a plurality of first driving voltages on a first row of a plurality of pixel units according to a first driving signal, wherein the plurality of data registers coupled to the plurality of pixel units; and setting, by the driving circuit and the plurality of data registers, a plurality of second driving voltages on a second row of the plurality of pixel units according to a second driving signal; wherein setting the plurality of second driving voltages in the second row of the plurality of pixel units comprises: when one of the plurality of second driving voltages is equal to one of the plurality of first driving voltages, and both correspond to a same one of the plurality of data registers, disabling an input terminal of the same one of the plurality of data registers, so that the same one of the plurality of data registers maintains the one of the plurality of first driving voltages as the one of the plurality of second driving voltages.

Another aspect of the present disclosure is a display panel, comprising a pixel circuit, a register circuit and a driving circuit. The pixel circuit comprise a plurality of pixel units, wherein the plurality of pixel units is divided into a plurality of rows according to a plurality of scan lines. The register circuit comprises a plurality of data registers. The plurality of data registers is coupled to the plurality of pixel units through a plurality of data lines. The driving circuit is coupled to the register circuit and the plurality of scan lines, configured to set a plurality of first driving voltages on a first row of the plurality of pixel units by the plurality of data registers, and configured to set a plurality of second driving voltages on a second row of the plurality of pixel units by the plurality of data registers. When one of the plurality of second driving voltages is equal to one of the plurality of first driving voltages, and both correspond to a same one of the plurality of data registers, the driving circuit is configured to not output the one of the plurality of second driving voltages, and the same one of the plurality of data registers is configured to maintain the one of the plurality of first driving voltages as the one of the plurality of second driving voltages.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
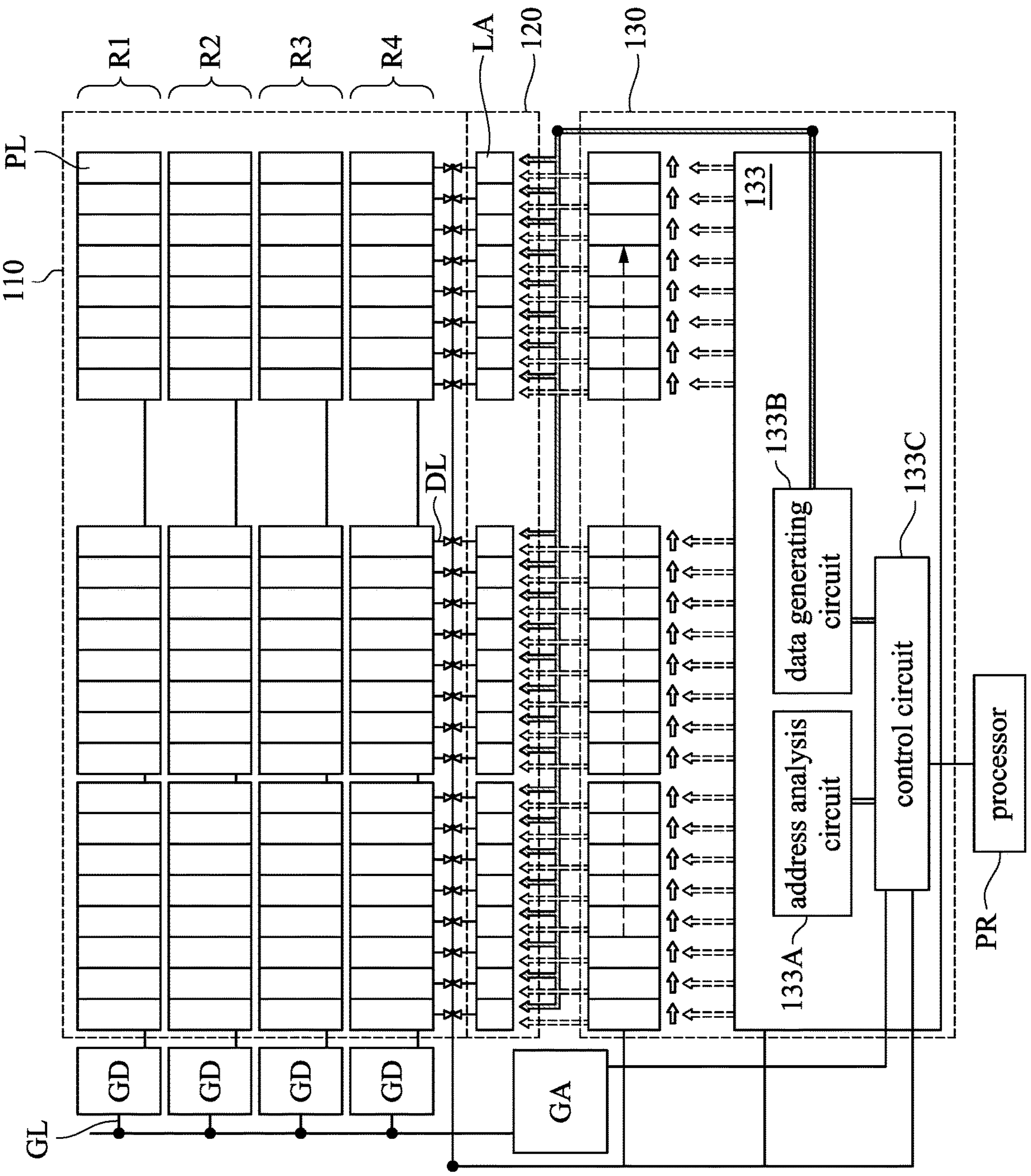
FIG. 1 is a schematic diagram of a display panel in some embodiments of the present disclosure.

FIG. 1 is a schematic diagram of a display panel 100 in some embodiments of the present disclosure. The display panel 100 is communicatively connected to a processor PR, so as to receive a display signal from the processor PR. The display panel 100 is configured to display an image screen according to the received display signal.

The display panel 100 includes a pixel circuit 110, a register circuit 120 and a driving circuit 130. The pixel circuit 110 includes multiple pixel units PL. The pixel circuit 110 is coupled to multiple scan lines GL and multiple data lines DL to sequentially receive driving voltages corresponding to the display signal and to display different pixel value (e.g., grayscale value, brightness value). As shown in FIG. 1, the pixel units PL are divided into multiple rows R1-R4 along a first direction (such as the vertical direction in FIG. 1) according to the scan lines GL. The pixel units PL of each row are coupled to the corresponding data lines DL, respectively, so as to correspond to different positions in a second direction (such as the horizontal direction in FIG. 1). Since those skilled in the art can understand the principle of providing driving voltages to the pixel circuit 110 to display the image screen, which will not be described here.

The register circuit 120 includes multiple data registers LA, which are coupled to the pixel units PL through the data lines DL. In one embodiment, the data registers LA may be D-type flip-flops, but the present disclosure is not limited to this.

The driving circuit 130 is coupled to the register circuit 120 and the scan lines GL respectively to set the driving voltages of the pixel units PL by the data registers LA. For example, the first pixel values of multiple pixel units PL in the first row R1 are controlled according to multiple first driving voltages, or the second pixel values of the pixel units PL in the second row R2 are controlled according to multiple second driving voltages. "Driving voltage" is used to control the pixel unit PL to display the corresponding pixel value (e.g., control the flip angle and light transmittance of the liquid crystal). Taking the first driving voltages as an example, each of the first driving voltages corresponds to each of the pixel units PL in the first row R1 of the pixel circuit 110. In other words, "multiple first driving voltages" are used to represent the voltages of the pixel units PL corresponding to the first row R1, and each of the first driving voltages varies according to the pixel value that the image screen needs to display.

In one embodiment, the display panel 100 may be a liquid crystal display using Memory-In-Pixel (MIP) technology. Each of the pixel units PL has a memory to record the state of the liquid crystal, but the display panel of the present disclosure is not limited to MIP technology.

Figure 2:
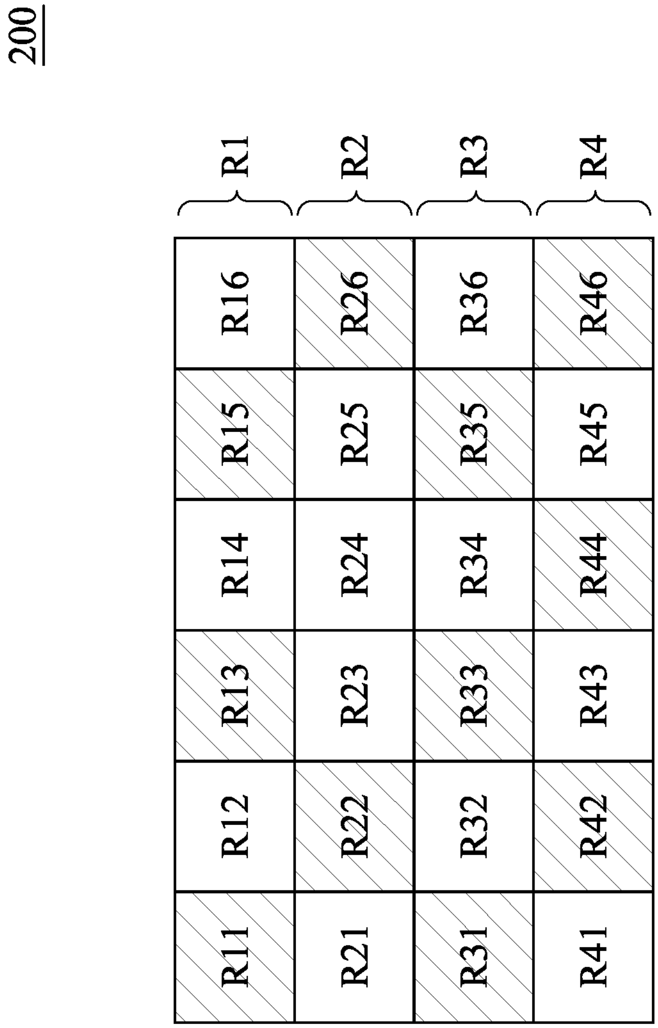
FIG. 2 is a schematic diagram of the image screen displayed of the display panel in some embodiments of the present disclosure.

FIG. 2 is a schematic diagram of the image screen 200 displayed of the display panel 100 in some embodiments of the present disclosure. The image screen 200 is displayed by the pixel units PL of the pixel circuit 110. For the convenience of explanation, the pixel value displayed by the pixel units PL in each row is marked as "R11-R16, R21-R26, R31-R36, R41-R46."

In the embodiment shown in FIG. 2, the pixel values R11-R16 of the first row R1 are "black, white, black, white . . . " from left to right, and the pixel value R21-R26 of the second row R2 are "white, black, white, white . . . " from left to right. Generally, when the display panel 100 updates the screen, the scan lines GL are driven sequentially (e.g., from top to bottom in FIG. 1 and FIG. 2) by the scanning circuit GA and the scan line controller GD, and the data lines DL are turned on in sequentially (e.g., from left to right in FIG. 1 and FIG. 2), so that the pixel units PL will be updated one by one. For example, the display panel 100 first updates the pixel values of the pixel units PL in the first row R1, the driving circuit 130 writes the driving voltages corresponding to the pixel values R11-R16 "black, white, black, white . . . " of the first row R1 by the data registers LA. Then, the display panel 100 updates the pixel values of the pixel units PL in the second row R2. The driving circuit 130 writes the driving voltages corresponding to the pixel values R21-R26 "white, black, white, white . . . " of the second row R2 by the data registers LA. However, the above update method is difficult to improve the frame rate of the display panel, and the image file will also be larger.

In one embodiment of the present disclosure, the format of the driving signal provided to the display panel is changed (detailed in subsequent paragraphs), so when the display panel 100 updates the screen, it only needs to write the driving voltages that are different from the pixel values of the previous row, which increases the update rate. In other words, when the driving voltages that need to be set for the pixel units PL corresponding to the same position (i.e., corresponding to the same data registers LA) in the second row R2 and the first row R1 are the same (e.g., both need to be set to "white"), the driving circuit 130 does not need to repeatedly output/write the second driving voltages to the data registers LA. At this time, the driving voltages output by the data registers LA maintains the first driving voltages output previously. That is, the data registers LA directly use/set the previously output first driving voltages as the second driving voltages. In some embodiments, the driving circuit 130 transmits a disable signal to the corresponding data register(s) LA (such as the "EN" terminal shown in FIG. 1), so that the corresponding data register(s) LA and the input terminal(s) do not receive the input signal.

For example, the driving circuit 130 first sets the pixel values of the first row R1, and then sets the pixel values of the second row R2. The pixel values R11-R16 of the first row R1 are "black, white, black, white . . . ", and the pixel values R21-R26 of the second row R2 are "white, black, white, white . . . ". When the driving circuit 130 sets the pixel values of the second row R2, the driving circuit 130 first updates the first three pixel values "white, black, white", but the fourth pixel value R24 is equal to the pixel value R14 of the first row, so there is no need to update. The driving circuit 130 can ignore the pixel value R24 and continue to set the last two pixel values R25-R26. In other words, the driving circuit 130 does not need to write data to the data registers LA corresponding to the pixel units PL (the pixel value R24). Accordingly, the update rate of the display panel 100 can be improved.

Figure 3:
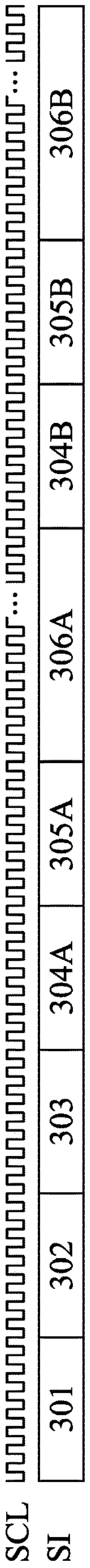
FIG. 3 is a schematic diagram of the driving signal applied in the display panel in some embodiments of the present disclosure.

Please refer to FIGS. 1-3, which describe the format of the driving signal (serial data). FIG. 3 is a schematic diagram of the driving signal SI applied in the display panel in some embodiments of the present disclosure. In one embodiment, the display panel 100 receives multiple driving signals, each of the driving signals corresponding to each row of the pixel units PL (e.g., R1-R4). Taking the image screen 200 shown in FIG. 2 as an example, since the pixel value R24 of the second row R2 is equal to the pixel value R14 of the first row R1, the driving circuit does not need to write the driving voltage again, but can continue to use the driving voltage of the pixel value R14 to set the pixel value R24. The driving signal SI is pass transmitted to the driving circuit 130 along with a clock signal SCL (serial clock), and includes the following information:

(1) The model select data 301: the model select data 301 is configured to notify the driving circuit 130 to update the pixel circuit 110.

(2) The scan address 302: the scan address 302 is configured to indicate a row in the pixel units PL that currently needs to be updated (herein referred to as the "current row"). If the pixel units PL of the second row R2 currently need to be updated, the driving circuit 130 will drive the corresponding one of scan lines GL according to the scan address.

(3) The update quantity 303: the update quantity 303 is configured to indicate how many pieces the current row needs to be updated in. For example, the pixel values in the second row R2 that are different from the first row R1 are "R21-R23" and "R25-R26", so the update will be divided into two pieces.

(4) The update start address 304A-304B: the update start address 304A-304B is configured to indicate an update starting point, which corresponds to "data register LA" of the pixel value that needs to be updated. Taking FIG. 2 as an example, since the second row R2 is divided into two pieces to update, there will be two update start addresses 304A-304B. The driving circuit 130 identifies/finds the corresponding data register LA according to the update start addresses 304A-304B (e.g., corresponding to the pixel value R21 and R25), and start updating with the identified data register LA as the update starting point.

(5) The update time 305A-305B: the update time 305A-305B is configured to indicate the length of the updated content of each piece (e.g., the number of passes through the clock signal). Taking FIG. 2 as an example, the first piece that needs to be updated in the second row R2 is the pixel values R21-R23. Therefore, the update time 305A is required for "writing data to the three data registers LA in sequence" length of time.

(6) The updated data 306A-306B: the updated data 306A-306B is configured to indicate the data setting the pixel units PL (e.g., the driving voltages). In other words, the driving circuit 130 is configured to generate the driving voltages according to the updated data 306A-306B. Taking FIG. 2 as an example, after the driving circuit 130 identifies the corresponding data register LA (e.g., corresponding to the pixel value R21) as an update starting point according to the update start address 304A, the driving circuit 130 starts timing, and sequentially outputs the three driving voltages corresponding to the pixel values R21-R23 to the corresponding three data registers LA according to the updated data 306A. After the driving voltages are input to the corresponding pixel units PL by the corresponding three data registers LA, the time measured by the driving circuit 130 will just exceed the update time 305A. At this time, the driving circuit 130 disables the internal shift registers to complete the update of the first piece.

Figure 4:
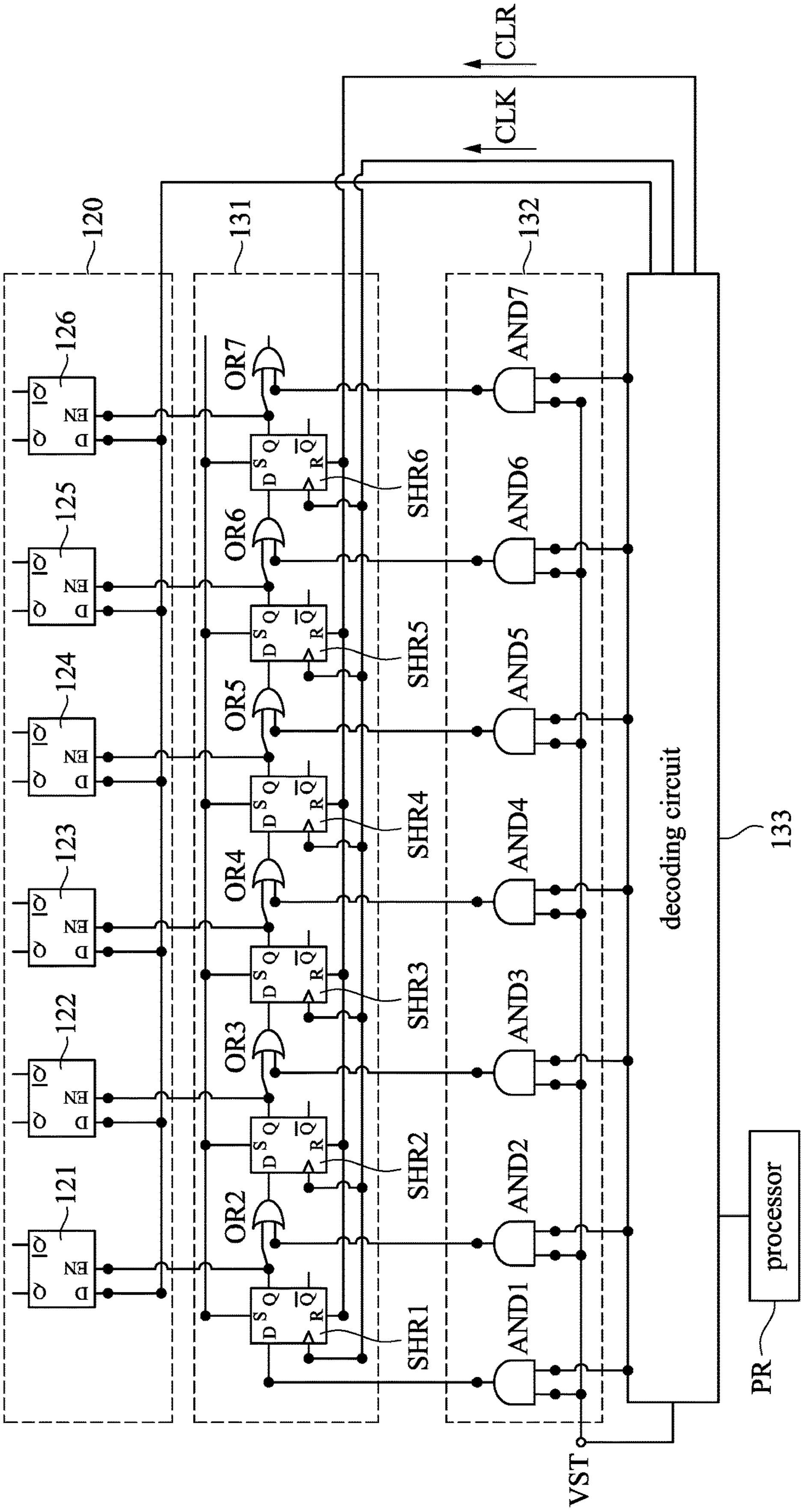
FIG. 4 is a partial schematic diagram of the display panel in some embodiments of the present disclosure.

FIG. 4 is a partial schematic diagram of the display panel 100 in some embodiments of the present disclosure. In FIG. 4, the similar components associated with the embodiment of FIG. 1 are labeled with the same numerals for ease of understanding. The specific principle of the similar component has been explained in detail in the previous paragraphs, and unless it has a cooperative relationship with the components of FIG. 4, it is not repeated here.

In one embodiment, the register circuit 120 includes multiple data registers 121-126 (same as the data registers LA shown in FIG. 1). The data registers 121-126 are coupled to the pixel units PL through the data lines DL (shown in FIG. 1). The driving circuit 130 includes a shift registering circuit 131, a logic circuit 132 and a decoding circuit 133. The shift registering circuit 131 includes multiple shift registers SHR1-SHR6, and each of the shift registers SHR1-SHR6 corresponds to each of the data registers 121-126. The output terminals of the shift registers SHR1-SHR6 are coupled to the control terminals of the corresponding data registers SHR1-SHR6. When the disable signal is input to the control terminals of the data registers SHR1-SHR6, the data registers SHR1-SHR6 will not receive new input signal, and will maintain the output signal. The shift registers SHR1-SHR6 are connected through multiple the control logic elements OR2-OR6. In one embodiment, each of control logic elements OR2-OR6 include an "OR gate".

The logic circuit 132 includes multiple switching logic elements AND1-AND6. The output terminal of the first switching logic elements AND1 is directly coupled to the input terminal of the first data registers SHR1, and the output terminals of the other switching logic elements AND2-AND6 are coupled to the input terminals of the corresponding control logic elements OR2-OR6. In one embodiment, each of the switching logic elements AND1-AND6 include an "AND" gate. The input terminals of one of the switching logic elements AND1-AND6 is used to receive a start signal VST.

Referring to FIG. 1 and FIG. 4, the decoding circuit 133 is coupled to the other input terminal of the switching logic elements AND1-AND6, and is configured to receive the driving signal provided by the processor PR. In one embodiment, the decoding circuit 133 further includes an address analysis circuit 133A, a data generating circuit 133B, and a control circuit 133C. The address analysis circuit 133A is coupled to the logic circuit 132, and is configured to enable the switching logic element used as an update starting point according to the update start address of the driving signal. The data generating circuit 133B is coupled to the register circuit 120, and is configured to output the corresponding driving voltages according to the driving signal.

The control circuit 133C is configured to output various control signals of the display panel 100, including a clock signal CLK, a clear signal CLR and a start signal VST. The clear signal CLR is a disable signal, used to stop the operation of the shift registers SHR1-SHR6.

Figure 5:
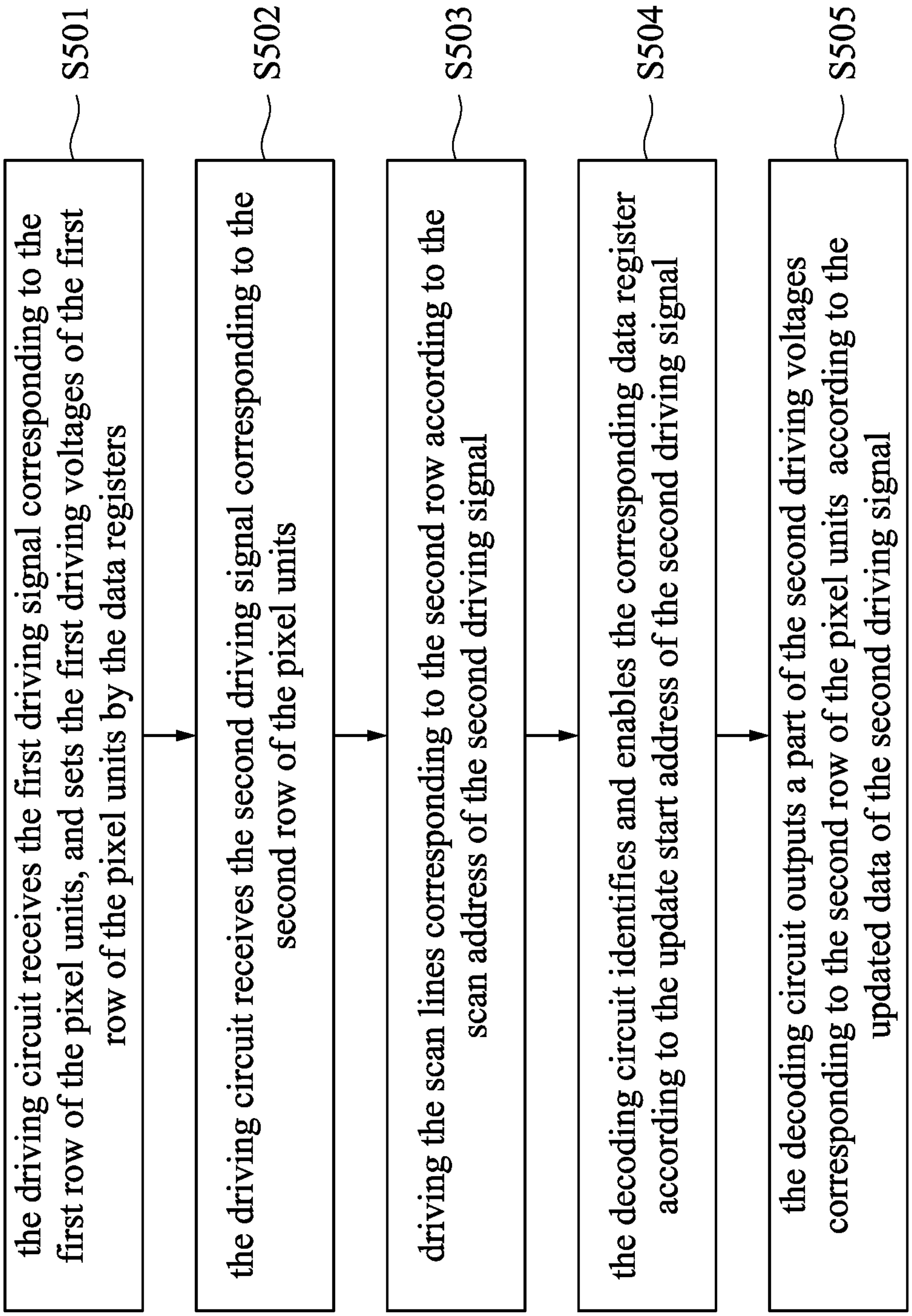
FIG. 5 is a flowchart illustrating an image display method in some embodiments of the present disclosure.

FIG. 5 is a flowchart illustrating an image display method in some embodiments of the present disclosure. Referring to FIG. 1-FIG. 5, in step S501, the driving circuit 130 sequentially receives multiple driving signals from the processor PR, and each of the driving signals corresponds to pixel values in one of rows of the image screen in the same frame. The driving signal is generated by the processor PR according to an original image file, and the generation method will be detailed in the subsequent paragraphs.

For the convenience of explanation, taking the process of the display panel 100 updating the first row R1 and the second row R2 as an example to describe, the other rows can be displayed and updated in the same way as the first row R1 and/or the second row R2. In one embodiment, the driving circuit 130 first receives the first driving signal corresponding to the pixel units PL of the first row R1 from the processor PR, and sets multiple first driving voltages of the pixel units PL of the first row R1 by the data registers 121-126 according to the first driving signal to display the pixel value R11-R16. Since the pixel units PL of the first row R1 is a first row in the update process, the driving circuit 130 writes the driving voltages corresponding to all pixel units PL of the first row R1 by the data registers 121-126 to set all the pixel values R11-R16 of the first row R1.

In step S502, the driving circuit 130 receives the second driving signal corresponding to the pixel units PL of the second row R2. As mentioned above, in this embodiment, the display panel 100 does not need to update the pixel units PL at the same position (corresponding to the same data lines DL) and with the same pixel value. Therefore, the second driving signal does not need to include the driving voltages of all pixel units PL in the second row R2 (e.g., does not need to include the driving voltage of the pixel value R24). The driving circuit 130 can still set each of the pixel units PL in the second row R2 to the corresponding pixel value R21-R26 according to the second driving signal.

In step S503, the control circuit 133C of the decoding circuit 133 confirms the type of the second driving signal according to the model select data 301 of the second driving signal. The address analysis circuit 133A of the decoding circuit 133 confirms the position of the second row R2 of the pixel units PL that currently needs to be updated according to the scan address 302 of the second driving signal, and drives the scan line GL corresponding to the second row R2. In particular, in this embodiment, the driving circuit 130 sets the pixel value of the second row R2 after setting the pixel value of the first row R1. However, in other embodiments, the order in which the display panel 100 updates the pixel units PL is not limited to "scanning sequentially from top to bottom." In other words, "the second row R2" indicated by the second driving signal may also be the fourth row of vertical rows of the display panel 100. The processor PR that generates the driving signal can adjust the update order according to the similarity between the pixel values in multiple rows. This application will be explained in the subsequent paragraphs.

In one embodiment, the decoding circuit 133 is further configured to confirm that the second row R2 needs to be divided into several pieces for update according to the update quantity 303 of the second driving signal. For example, since the pixel values in the second row R2 that are different from the first row R1 are "R21-R23" and "R25-R26", the update will be divided into two pieces.

In step S504, the address analysis circuit 133A of the decoding circuit 133 identifies and enables the corresponding data registers according to the update start address of the second driving signal. Taking FIG. 2 as an example, since the pixel value R21 of the first pixel unit PL of the second row R2 needs to be updated, the update start address 304A corresponds to the data register SHR1. When the start signal VST and the signal provided by the decoding circuit 133 to the switching logic elements AND1 are both "1" (enabled), the shift registers SHR1 will be enabled, and subsequently the other shift registers will operate accordingly. Since those skilled in the art can understand the principle of the shift registers, and thus they are not further detailed herein.

Similarly, when setting the pixel value R25-R26 of the second piece, the address analysis circuit 133A enables the corresponding control logic element OR5 according to the update start address 304B, so that the corresponding shift register SHR5 is enabled, and the corresponding data register 125 will be used as the update starting point. The other shift registers behind the shift register SHR5 will be enabled sequentially with the clock signal CLK, but the other shift registers SHR1-SHR4 in front of the shift register SHR5 will be disabled. In one embodiment, the decoding circuit 133 enables the corresponding switching logic element AND5 according to the update start address 304B, and disables other switching logic elements, thereby enabling the corresponding control logic element OR5.

In step S505, the data generating circuit 133B of the decoding circuit 133 sequentially outputs a part of the second driving voltages corresponding to the pixel units PL of the second row R2 to the corresponding part of the data registers according to the updated data of the second driving signal. In other words, the first pixel values and the second pixel values corresponding to the part of the data registers are different from each other, so the driving circuit 130 needs to actively write the second driving voltages to update the pixel value.

The aboved "part of the second driving voltages" represents the driving voltages need to be actively written to the data registers to update the corresponding pixel units PL, such as the second driving voltages of the pixel value R21-R23 shown in FIG. 2. Since the pixel value R24 of the second row R2 is equal to the pixel value R14 of the corresponding position (i.e., corresponding to the same data lines DL and the data registers 124) in the first row R1, the driving circuit 130 does not need to actively write the second driving voltages. As long as the data registers 124 maintain the original output voltage, the original output voltage can be directly used as the second driving voltage of the pixel value R24.

In one embodiment, the driving circuit 130 uses the data registers SHR1 and SHR5 indicated by the update start addresses 304A and 304B as the update starting points to output the second driving voltages to the corresponding parts of the data registers in sequence. In addition, the driving circuit 130 can also start timing when it starts to output the second driving voltages. When the timing time exceeds the update time of the second driving signal, outputting a clear signal CLR as the disable signal to interrupt all the shift registers to prevent error signals from being continuously input.

Figure 6:
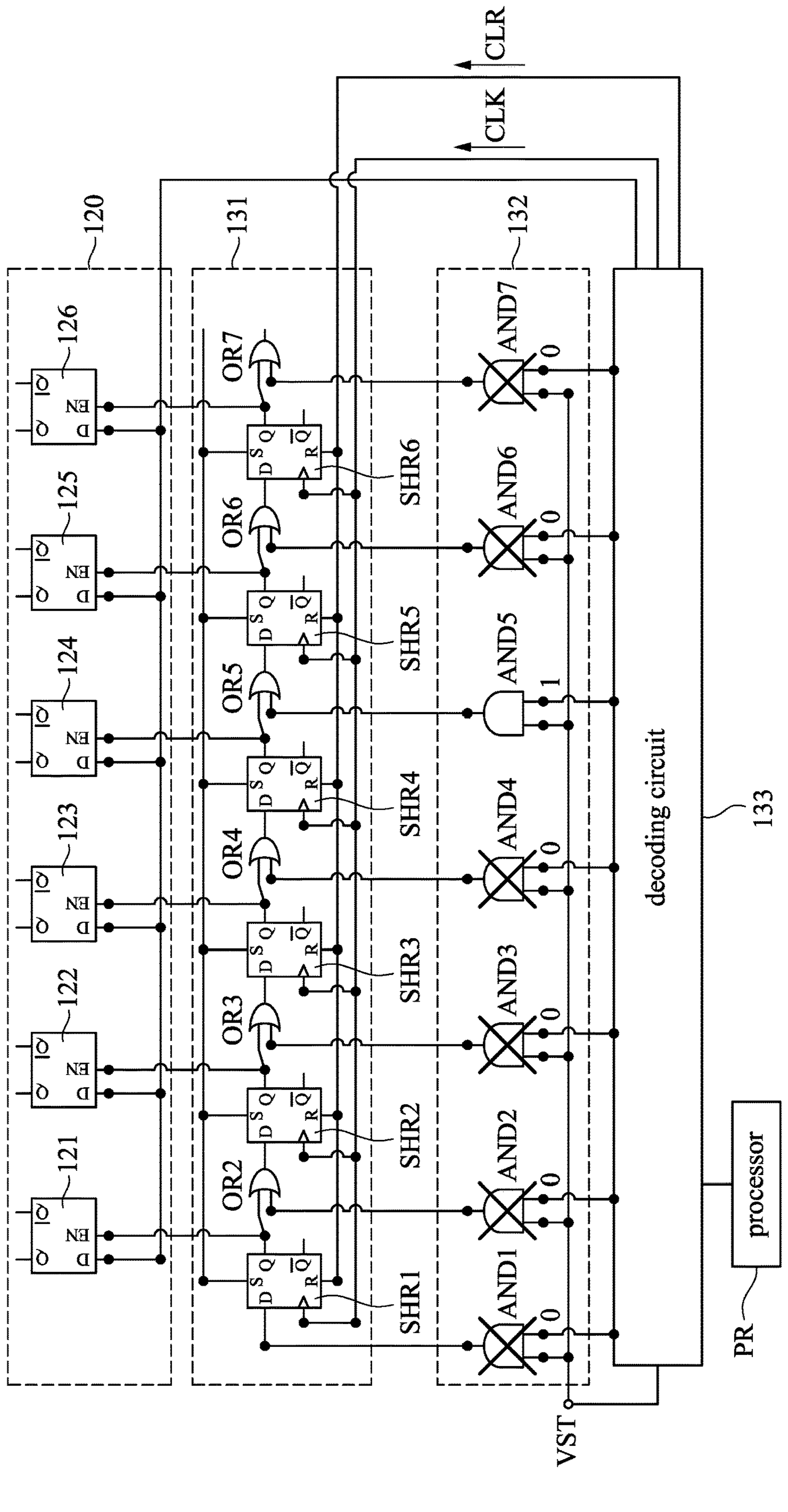
FIG. 6 is a schematic diagram of the operation of the display panel in some embodiments of the present disclosure.

The above steps S504-S505 can be performed repeatedly to complete the update of the pixel units PL in the same row. For example, in step S503, after confirming that the one currently to be updated is pixel units PL of the second row R2, the display panel 100 first performs steps S504-S505 once to update pixel values (e.g., R21-R23) of the pixel units of the first piece. Then, the display panel 100 performs steps S504-S505 for the second time to update pixel values (e.g., R25-R26) of the pixel units of the second piece. In order to illustrate the operation of the driving circuit 130, FIG. 2 and FIG. 6 are taken as examples. FIG. 6 shows a schematic diagram of the signal status when the display panel 100 is updating the pixel values R25-R26 of the second piece of the second row R2. When setting the pixel values R25-R26 of the second piece, the decoding circuit 133 enables the switching logic element AND5 and disables other switching logic elements. The switching logic element AND5 will further input the enable signal to the control logic element OR5. Since the control logic element OR5 is an OR gate, the output signal is also an enable signal to enable the corresponding shift register SHR5.

As mentioned above, at this time, the control terminals (EN) of the shift registers SHR1-SHR4 receives the disable signal, so that the input terminals of the shift registers SHR1-SHR4 will be disabled and will not receive the signal. Therefore, the second driving voltages output by the decoding circuit 133 are provided to the data register 125 corresponding to the shift register SHR5 to update the pixel value R25. The data registers 125 is used to as an update starting point, and in response to the clock signal CLK, the subsequent data registers 126 will be enabled in sequence, thereby updating the pixel value R26, and so on.

In addition, since the pixel value R24 is the same as the pixel value 14, when updating pixel values of the second row R2, the data register 124 corresponding to the pixel value R24 will be disabled and will not receive the input signal. At this time, the data register 124 maintain the output of the first driving voltages input previously.

In some embodiments, the present disclosure further generates the driving signal according to an original image data. As shown in FIG. 1-FIG. 4, the processor PR receives the original image data, where the original image data includes pixel values corresponding to pixel units PL of each row. The processor PR compares "the first pixel values R11-R16 corresponding to the pixel units PL of the first row R1" and "the second pixel values R21-R26 of the pixel units PL corresponding to the second row R2". According to a difference result obtained after comparison, the driving signal format shown in FIG. 3 is generated.

The processor PR does not need to generate the driving signals sequentially in the same direction (e.g. from top to bottom). In one embodiment, the processor PR will compare the pixel value of different rows (corresponding to the scan lines GL), then set "the first row R1" and "the second row R2" according to the comparison results. Specifically, the processor PR calculates difference values between the pixel values of each row, and then sets a sorting result of the pixel values of each row (i.e., the order of updates) according to the difference values. After confirming the sorting result of pixel values, the processor PR sets/defines "the first row R1" and "the second row R2" accordingly.

Figure 7:
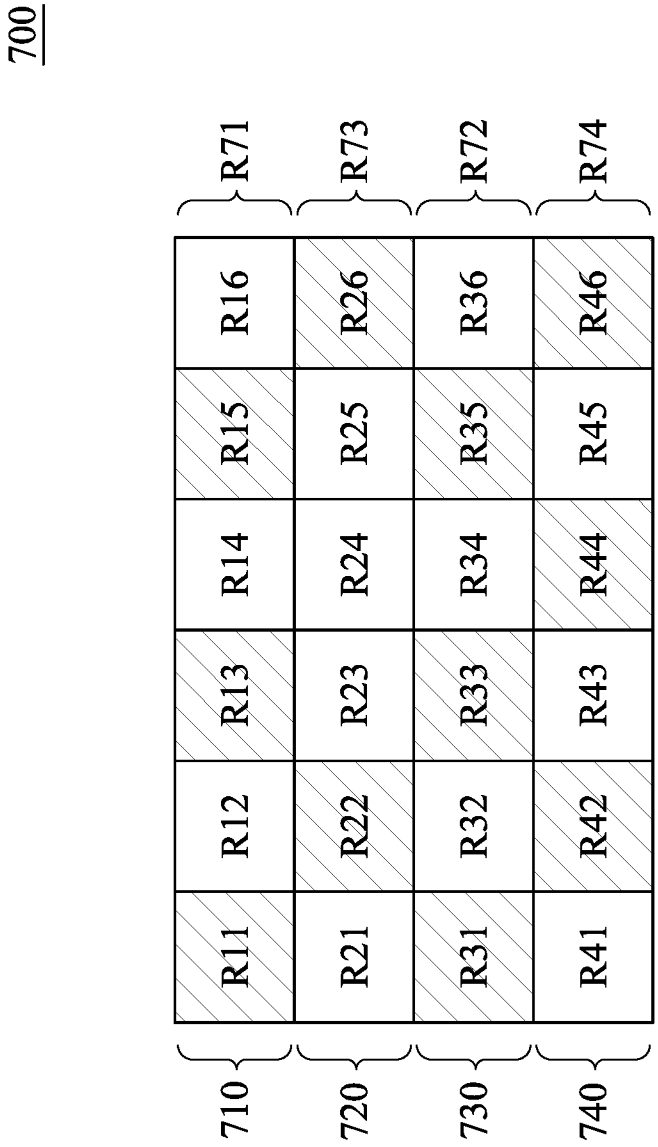
FIG. 7 is a schematic diagram of the image screen displayed of the display panel in some embodiments of the present disclosure.

Referring to to FIG. 1 and FIG. 7. FIG. 7 shows a schematic diagram of the image screen 700 displayed by the display panel 100 in some embodiments of the present disclosure. The image screen 700 is divided into multiple rows of physical locations 710-740 from top to bottom. The pixel values of the physical locations 710 and 730 are most similar. Therefore, the processor PR sets the physical locations 710 and 730 to "the first row R71" and "the second row R72" when updating. Accordingly, after updating the pixel values of the first row R71, the display panel 100 will not need to write any data to the data registers LA. The display panel 100 can use the driving voltages used to update the first row R71 to directly update the pixel value of the second row R72.

Similarly, comparing the physical locations 720 and 740 with the physical location 730, since the physical location 720 and the physical location 730 have more of the same pixel values, the processor PR sets the physical location 720 to "the third row R73" when updating, and sets the physical location 740 to "the fourth row R74" when updating. Accordingly, the number of times the driving voltages need to be actively input is reduced, so the update rate of the display panel can be improved.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An image display method, comprising:

setting, by a driving circuit and a plurality of data registers, a plurality of first driving voltages on a first row of a plurality of pixel units according to a first driving signal, wherein the plurality of data registers coupled to the plurality of pixel units; and setting, by the driving circuit and the plurality of data registers, a plurality of second driving voltages on a second row of the plurality of pixel units according to a second driving signal;

wherein setting the plurality of second driving voltages in the second row of the plurality of pixel units comprises:

when one of the plurality of second driving voltages is equal to one of the plurality of first driving voltages, and both correspond to a same one of the plurality of data registers, disabling an input terminal of the same one of the plurality of data registers, so that the same one of the plurality of data registers maintains the one of the plurality of first driving voltages as the one of the plurality of second driving voltages.

2. The image display method of claim 1, wherein the plurality of first driving voltages is configured to control a plurality of first pixel values of the first row of the plurality of pixel units, the plurality of second driving voltages is configured to control a plurality of second pixel values of the second row of the plurality of pixel units, and setting the plurality of second driving voltages in the second row of the plurality of pixel units further comprises:

outputting a part of the plurality of second driving voltages to a part of the plurality of data registers according to the second driving signal, wherein at least one of the plurality of first pixel values corresponding to the part of the plurality of data registers is different from at least one of the plurality of second pixel values corresponding to the part of the plurality of data registers.

3. The image display method of claim 2, wherein outputting the part of the plurality of second driving voltages to the part of plurality of data registers comprises:

driving a scan line corresponding to the second row of the plurality of pixel units according to a scan address of the second driving signal;

identifying one of the plurality of data registers according to an update start address of the second driving signal;

outputting the part of the plurality of second driving voltages according to an updated data of the second driving signal; and using the one of the plurality of data registers as an update starting point, and sequentially outputting the part of the plurality of second driving voltages to the part of the plurality of data registers.

4. The image display method of claim 3, wherein sequentially outputting the part of the plurality of second driving voltages to the part of plurality of data registers comprises:

when outputting the part of the plurality of second driving voltages and an update time of the second driving signal is exceeded, disabling a plurality of shift registers in the driving circuit.

5. The image display method of claim 3, wherein the driving circuit comprises a plurality of shift registers, a plurality of output terminals of the plurality of shift registers is coupled to a plurality of control terminals of the plurality of data registers, and sequentially outputting the part of the plurality of second driving voltages to the part of the plurality of data registers comprises:

enabling one of a plurality of control logic elements to use the one of the plurality of data registers as the update starting point, wherein the plurality of control logic elements is coupled between the plurality of shift registers.

6. The image display method of claim 5, wherein sequentially outputting the part of the plurality of second driving voltages to the part of the plurality of data registers further comprises:

enabling one of a plurality of switching logic elements to enable the one of the plurality of control logic elements, wherein a plurality of output terminals of the plurality of switching logic elements is coupled to a plurality of input terminals of the plurality of control logic elements.

7. The image display method of claim 6, wherein the plurality of control logic elements comprises a plurality of OR gates, and the plurality of switching logic elements comprises a plurality of AND gates.

8. The image display method of claim 1, wherein the plurality of pixel units are divided into a plurality of rows according to a plurality of scan lines, and the image display method further comprises:

receiving, by a processor, an original image data, wherein the processor is communicatively connected to the driving circuit, and the original image data comprises a plurality of pixel values corresponding to the plurality of rows of the plurality of scan lines, and the plurality of pixel values comprises a plurality of first pixel values and a plurality of second pixel values; and comparing a plurality of first pixel values corresponding to the first row of the plurality of pixel units and a plurality of second pixel values corresponding to the second row of the plurality of pixel units, so as to generate the first driving signal and the second driving signal.

9. The image display method of claim 8, further comprising:

comparing the plurality of pixel values of the plurality of rows corresponding the plurality of scan lines to set the first row and the second row of the plurality of pixel units.

10. The image display method of claim 9, wherein comparing the plurality of pixel values of the plurality of rows corresponding the plurality of scan lines comprises:

calculating a plurality of difference values between the plurality of pixel values of the plurality of rows corresponding the plurality of scan lines;

sorting the plurality of pixel values of each row of the plurality of rows; and setting the first row and the second row of the plurality of pixel units according to a sorting result of the plurality of pixel values of each row of the plurality of rows.

11. A display panel, comprising:

a pixel circuit comprising a plurality of pixel units, wherein the plurality of pixel units is divided into a plurality of rows according to a plurality of scan lines;

a register circuit comprising a plurality of data registers, wherein the plurality of data registers is coupled to the plurality of pixel units through a plurality of data lines; and a driving circuit coupled to the register circuit and the plurality of scan lines, configured to set a plurality of first driving voltages on a first row of the plurality of pixel units by the plurality of data registers, and configured to set a plurality of second driving voltages on a second row of the plurality of pixel units by the plurality of data registers;

wherein when one of the plurality of second driving voltages is equal to one of the plurality of first driving voltages, and both correspond to a same one of the plurality of data registers, the driving circuit is configured to not output the one of the plurality of second driving voltages, and the same one of the plurality of data registers is configured to maintain the one of the plurality of first driving voltages as the one of the plurality of second driving voltages.

12. The display panel of claim 11, wherein the plurality of first driving voltages is configured to control a plurality of first pixel values of the first row of the plurality of pixel units, the plurality of second driving voltages is configured to control a plurality of second pixel values of the second row of the plurality of pixel units;

wherein the driving circuit is configured to receiving a first driving signal and a second driving signal, and output a part of the plurality of second driving voltages to a part of the plurality of data registers according to the second driving signal; and wherein at least one of the plurality of first pixel values corresponding to the part of the plurality of data registers is different from at least one of the plurality of second pixel values corresponding to the part of the plurality of data registers.

13. The display panel of claim 12, wherein the second driving signal comprises:

a scan address, wherein the driving circuit is configured to drive one of the plurality of scan lines according to the scan address;

an update start address, wherein the driving circuit is configured to identify one of the plurality of data registers according to the update start address; and an updated data, wherein the driving circuit is configured to output the part of the plurality of second driving voltages according to the updated data;

wherein the driving circuit is further configured to use the one of the plurality of data registers as an update starting point, and sequentially output the part of the plurality of second driving voltages to the part of the plurality of data registers.

14. The display panel of claim 13, wherein the second driving signal further comprises an update time, when the driving circuit outputs the part of the plurality of second driving voltages to the part of the plurality of data registers, the driving circuit is configured to disable a plurality of shift registers in the driving circuit when the update time is exceeded.

15. The display panel of claim 12, wherein the driving circuit comprises;

a shift registering circuit comprising a plurality of shift registers, wherein a plurality of output terminals of the plurality of shift registers is coupled to a plurality of control terminals of the plurality of data registers, and the plurality of shift registers is coupled though a plurality of control logic elements;

a logic circuit comprising a plurality of switching logic elements, wherein a plurality of output terminals of the plurality of switching logic elements is coupled to a plurality of input terminals of the plurality of control logic elements; and a decoding circuit coupled to the plurality of switching logic elements, and configured to receive the first driving signal and the second driving signal.

16. The display panel of claim 15, wherein the plurality of control logic elements comprises a plurality of OR gates.

17. The display panel of claim 15, wherein the plurality of switching logic elements comprises a plurality of AND gates.

18. The display panel of claim 15, wherein the second driving signal comprises an update start address and an update time, the decoding circuit is configured to identify one of the plurality of data registers according to the update start address to use the one of the plurality of data registers as an update starting point, and is configured to sequentially output the part of the plurality of second driving voltages to the part of the plurality of data registers according to the update time.

19. The display panel of claim 18, wherein the second driving signal further comprises an update time, when the driving circuit sequentially outputs the part of the plurality of second driving voltages to the part of the plurality of data registers, the driving circuit is configured to provide a disable signal to the plurality of shift registers when the update time is exceeded.

20. The display panel of claim 19, wherein the decoding circuit further comprises:

a address analysis circuit coupled to the logic circuit, and configured to enable one of the plurality of switching logic elements according to the update start address; and a data generating circuit coupled to the register circuit, and configured to output the part of the plurality of second driving voltages according to the second driving signal.

* * * * *